United States Patent [19]

Tacussel

[11] 4,435,699
[45] Mar. 6, 1984

[54] PROCESS AND INSTALLATION FOR THE REMOTE CONTROL OF A PREMISES WATCH RADAR APPARATUS

[76] Inventor: Maurice Tacussel, 105 bis, rue de Point de Jour, 92100 Boulogne-Billancourt, France

[21] Appl. No.: 931,433

[22] Filed: Aug. 7, 1978

Related U.S. Application Data

[63] Continuation of Ser. No. 739,022, Nov. 4, 1976, abandoned.

[30] Foreign Application Priority Data

Nov. 7, 1975 [FR] France .............................. 75 34214

[51] Int. Cl.³ .......................... G08B 1/08; G08B 13/26
[52] U.S. Cl. ................................. 340/539; 340/551; 340/561; 340/825.06; 340/825.69; 340/825.72; 455/78; 455/352
[58] Field of Search ............... 340/539, 551, 552, 554, 340/560, 561, 565, 309.1, 694–696, 506, 825.06, 825.69, 825.22; 343/225, 5 R; 325/37, 309, 390–395; 455/73, 78, 344, 345, 352

[56] References Cited

U.S. PATENT DOCUMENTS

| | | | |
|---|---|---|---|
| 3,440,347 | 4/1969 | Spencer et al. | 179/1 |
| 3,510,777 | 5/1970 | Gordon | 325/55 |
| 3,594,768 | 7/1971 | Harris | 340/258 A |
| 3,597,531 | 8/1971 | Marinis | 325/395 |
| 3,628,153 | 12/1971 | Fukata | 343/228 |
| 3,680,073 | 7/1972 | Humphrey et al. | 340/258 A |
| 3,732,555 | 5/1973 | Strenglein | 343/228 |
| 3,801,977 | 4/1974 | Cotter | 340/560 |

*Primary Examiner*—Donnie L. Crosland
*Attorney, Agent, or Firm*—Curtis, Morris & Safford

[57] ABSTRACT

In a system for the remote control of premises using a watch radar apparatus for detecting intrusions into its field of radiation, including an alarm device, wherein the reception by the radar apparatus of radiation from portable transmitting device controls the connection of the radar apparatus to the alarm device, so that the alarm is made to change from an operative state to an inoperative state, and to change from an inoperative state to an operative state in response to the actuation of said portable transmitting device.

16 Claims, 5 Drawing Figures

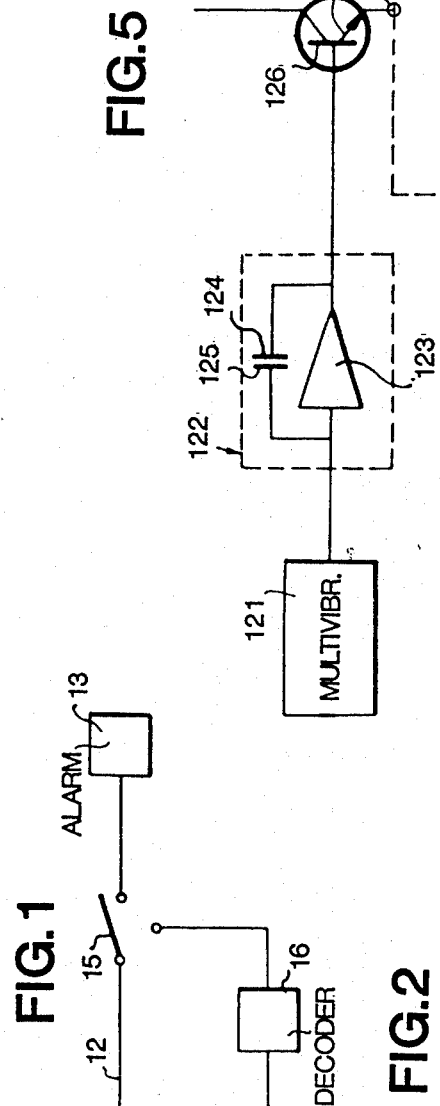

PROCESS AND INSTALLATION FOR THE REMOTE CONTROL OF A PREMISES WATCH RADAR APPARATUS

This application is a continuation of application Ser. No. 739,022, filed Nov. 4, 1976, now abandoned.

The invention relates to installations for the detection of intruders in premises by a watch radar apparatus using the Doppler effect, the existence of an intruder in the premises triggering through the radar apparatus the release of an alarm, usually an audible alarm.

In known watch radar systems, authorized persons can inhibit the alarm by switching on a portable radio-transmitting device, the signals of which are received by the radar.

Such an installation switches-back to its initial mode of operation when the signals emitted by the portable transmitting device are no longer received by the radar apparatus such remote control of a watch radar system is disadvantageous in that in order to inhibit the alarm the portable radio transmitting device must continue transmitting during the entire time authorized persons are within the field of radiation of the radar.

One object of the invention is to provide an installation which can be made operative or inoperative at will by simply transmitting a signal from a portable transmitter, such system being designed to make use of few and simple components.

The installation according to the invention, for the detection of intruders in a premises comprises a watch radar apparatus using the Doppler effect, and is characterized by the fact that the connection between the alarm device and the radar apparatus, whose alarm is initially in the inoperative state when the installation is first connected to an electrical supply, is made operative by switching on a portable transmitting device.

The invention is further characterized in that, when the alarm is reset into its operative state the same signals which have reset the alarm can, by further transmission of the portable transmitting device, set the alarm into its inoperative state. The state selected by the operation of the portable transmitting device does not change when the transmission from the portable transmitting device is no longer received by the radar.

The invention is advantageously applied in the case of a pulse watch radar apparatus, which enables a continuous electrical supply of the apparatus without a prohibitive energy consumption. According to the invention, the apparatus is then permanently maintained in its watch state, with all its components ready to work, in such a way that the portable transmitting device is by itself sufficient to switch the apparatus from its inoperative state to its operative state and vice versa.

The user is in this way freed from all the constraints linked with a wired hand operated control.

However, the invention does not preclude a double control of the installation, that is to say a local wire-connected hand actuation and also a remote control.

The invention provides furthermore a watch radar system in which the switching of the alarm from one state to the other state is performed only when this alarm has remained in a given state for a predetermined period. Therefore if the user, either unwittingly, or in an excessive wish of reliability, repeatedly switches the portable transmitting device on, the watch radar system remains in the desired state.

The following detailed description, will be best understood in conjunction with the accompanying drawings in which FIG. 1 is an abbrievated block diagram of a premises watch radar system;

FIG. 2 is a diagram showing the pulse width and duty cycle of the watch radar system, used for explaining the circuit in FIG. 4.

FIG. 3 is a diagram showing of frequency modulated watch radar signal, used for explaining the operation of the circuit in FIG. 4.

FIG. 5 is a detailed schematic representation of a portable transmitting device according to an embodiment of the present invention.

Figure 4:
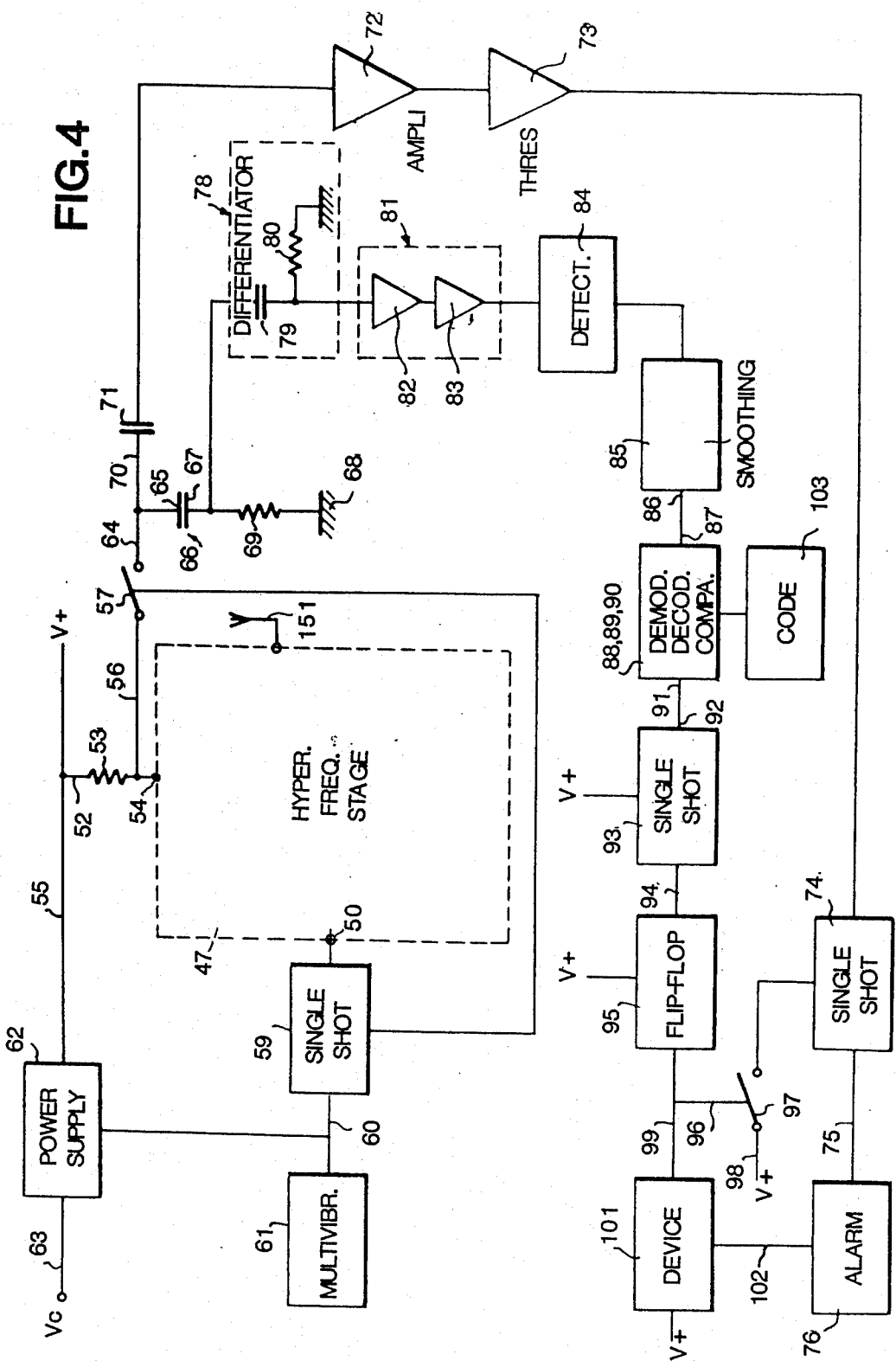
FIG. 4 is a detailed schematic representation of the watch radar system according to an embodiment of the invention.

Referring the drawings and initially to FIG. 1 thereof, radar transmitter-receiver 11, of the homodyne type, i.e. comprising a constitutive part working for the emission as well as for the reception, and able to keep a watch by pulse emission, the duration of each of the pulses being, for example, 25 $\mu$s, these pulses being separated by intervals, as schematically represented on FIG. 2, those numerical indications being given only by way of example and in order to enable a better understanding.

The radar transmitter-receiver 11, comprising a transmitting-receiving stage as well as a transmitting and receiving antenna, provides a signal along channel 12 for sounding alarm 13 which may be a buzzer, siren, or another analogous alarm apparatus, whenever the radar transmitter-receiver 11 applies to channel 12 a signal frequency shifted within a band whose width is on the order of about ten hertz, which corresponds to the Doppler shift induced by the motion of an intruder in the field scanned by the antenna of the apparatus, the alarm 13 is actuated.

If the radar receiving part is provided to be sensitive in a 6 MHz band centered around the radar's nominal frequency, for example of 2450 MHz, the invention provides for a remote control transmitting device the frequency of which is modulated between limits lying on both sides of the nominal frequency, for example going from 2420 to 2480 MHz, the modulation having a frequency such that the remote control emission goes several times through the 2450 MHz frequency during the 25 $\mu$s period during which the radar head 11 is sensitive, as schematically represented on FIG. 3.

During emission by the remote control transmitting device, the radar transmitter-receiver 11 hence provides, via a second channel 14, a signal which operates to trigger an electronic switch 15, placed in the first channel 12, in series with radar transmitter-receiver 11 and alarm 13, thereby switching channel 12 from an open state to a closed state and vice versa. Channel 12 is suitably designed such that its pass band is sufficiently small in order for it to pass only the information corresponding to an intrusion and not the information which corresponds to the remote control emission. The period during which the frequency coming from the remote control is received by radar transmitter-receiver 11 is on the order of magnitude of a Doppler frequency and this signal is too brief to be passed by said channel 12.

In order to increase the security, the remote control emission is binary coded according to a modulation of the pulse width. The remote control transmitting device then comprises a coding device, for example, provided with an eight digital push button encoder or similar device permitting, in that case 256 different code patterns, channel 14 is then provided with a similar 8-digit decoding device 16.

The user can provide additional security by selecting the code used in his radar apparatus and remote control transmitting device.

With reference to FIG. 4.

Hyperfrequency stage 47 of the watch radar which operates in a pulse mode, is connected at its output terminal 54 across a resistance 53 to power buss 55. Output terminal 54 of hyperfrequency stage 47 is also connected by a conductor 56 to an electronic switch 57 controlled by a circuit 58 providing from a single shot multivibrator 59. The latter is controlled through a circuit 60 by a multivibrator 61 which in the embodiment described has a pulse repetition frequency of 200 Hz. A power supply 62 is connected by a line 63 to a current supply, such as standard 117 volt 60 $H_z$ commercial power $V_c$. Power supply 62 then provides the voltage $V_+$ to power bus 55 and supplied voltage to multivibrator 61, single shot multivibrator 59, and to the various components of the apparatus as well.

The rate of opening and closing of switch 57 is determined by the frequency of the multivibrator 61. When it is closed, a line 64 applies to plate 65 of a condenser 66 the voltage existing at output terminal 54 of hyperfrequency stage 47. The second plate 67 of condenser 66 is connected to ground 68 across resistance 69.

A condenser 70 connects the terminal 65, of condenser 66 through a coupling condenser 71, to an amplifier 72, the latter being connected through a threshold device 73, to a single shot multivibrator 74 provided to control by a circuit 75 the working of a alarm 76, which may be of a buzzer, bell, or any other alarm device.

The plate 67 of condenser 66 is connected through a differentiator circuit 78 comprising a condenser 79 and a resistance 80, to a video amplifier 81 provided with two stages 82 and 83. The output of the latter is fed to a detector 84, and thence to a smoothing device 85, the output 86 of which is connected to the input 87 of a demodulating, decoding, comparing device 88-89-90 which compares the signal decoded thereon with that of the code setting device 103 associated with it. The output 91 of the demodulating, decoding, comparing device 88-89-90 is connected to input 92 of a single shot multivibrator 93 the output 94 of which being connected to the input of a flip flop 95. When the flip flop 95 is in its "1" state, it is operative by a circuit 96, to close electronic switch 97, shown here in its open position, and which connects a supply circuit 98 through which the voltage $V+$ is supplied to the single shot multivibrator 74. The output of flip flop 95 is also connected, through a circuit 99, to a device 101 which, when it is made operative, activates by a circuit 102, alarm device 76 for a short period of predetermined duration.

FIG. 5 shows a diagram of an embodiment of a remote-control portable transmitting device used to control the watch radar alarm.

In the remote control transmitting device of FIG. 5 a multivibrator 121 is connected through an integrator device 122, comprising an amplifier 123 and a circuit 124 which a condenser 125, to the base 126 of an emitter-follower transistor 127, the emitter 128 being connected to a terminal 129 of hyperfrequency generator 131. Modulating terminal 138 of hyperfrequency oscillator 131 is connected to a modulating oscillator 134 through a modulator 135 which is associated with a pulse width coding device 136. The setting of the code on coding device 136 is made by a code setting device 137 associated to the coding device 136.

When the power is first applied to the watch radar apparatus as shown on FIG. 4, the simultaneous supply of flip flop 95 and of the single shot multivibrator 93 puts flip flop 95 into its "0" state, although the single shot multivibrator 93 is simultaneously put into its "1" state. The antenna 151 associated to the hyperfrequency circuit 49 of the radar emits pulses with the frequency of the multivibrator 61. After being reflected on an obstacle, the return pulses are received by antenna 151 and brought by the circuit comprising the coupling condenser 71, the amplifier 72 and the threshold device 73 to the input of single shot multivibrator 74. Condenser 66 acts to vary the amplitude of the signal to the input of amplifier 72, whenever the return pulses are Doppler shifted corresponding to the motion of an intruder in the radar field.

Initially, because of the opening of electronic switch 97 to single shot multivibrator 74, the alarm 76 is in its inoperative state.

Single shot multivibrator 93 is of a type that, once it is caused to change to its "1" state, it remains in its "1" state until a predetermined period, for example, several seconds has elapsed, after which it returns to its "0" state. In order to be able to use the watch radar system, one must wait during at least this period before activating the remote control transmitting device.

When, after the period of several seconds has elapsed, the portable transmitting device is actuated, it emits hyperfrequency radiation which are frequency modulated according to a code, for example NRZ, with signals having two widths corresponding respectively to 1 and to 0, corresponding to the the code setting made on the code-setting device 137. The modulator 135 is here designed so that the frequency excursion of the hyperfrequency centered on 2450 MHz is, for example, of 30 MHz on both sides of the central frequency.

The modulating frequency of 150 kHz would then be appropriate.

The electromagnetic radiation coming from the transmitting device are received by antenna 151 and, during the periods when switch 57 is closed, is applied through the differentiator device 78 to the input of amplifier 81. Differentiator device 78 acts as a high-pass filter to stop the transmission of the Doppler frequencies.

The signals are then fed through detector 84 and smothing device 85 to demodulation decoding and comparating device 88-89-90, where the decoded signals are compared to the code set on the code setting device 103. If the result of the comparison is positive, i.e. if the setting on device 103 is the same as the setting on device 137, then single shot multivibrator 93 is brought into its "1" state; flip-flop 95 then changes its state, which operates to close switch 97. Closure of switch 97 activates single shot multivibrator 74 so that reception of Doppler-shifted radiation will actuate the alarm 76.

Simultaneously, the change of state of flip-flop 95 has resulted through the device 101 which functions as an alarm burst circuit, in the emission by buzzer 76 of a very short audible signal hence providing the user with the indication that the apparatus is in its operative mode and able to spot any intruder.

If, contraryly to the prescription of operation, the user switches on his transmitting device before the period of several seconds has elapsed, the only result of the remote control emission is to put single shot multivibrator 93 in its "1" state so that an additional period of several seconds must elapse before a remote control emission can bring back the watch radar apparatus to its operative condition. If the user fails to wait for the period of several seconds to elapse before actuating his remote control transmitter, the audible alarm of the watch radar system will fail to provide the expected very short audible signal.

When the user wants to bring again the watch radar system to its inoperative condition, for example, when he comes back to the premises after a trip, he actuates the remote control transmitting device which he carried with him. The actuation can take place when the user is at a greater distance than that corresponding to the radar's field of radiation. The emission from the user's portable remote control transmitting device results in operation of the watch radar apparatus described hereabove, so that single shot multivibrator 93 is brought back in its "1" state and flip-flop 95 changes its state again, opening switch 97 and returning the apparatus to the condition in which the alarm is no longer operable.

What I claim is:

1. A premises watch radar whose operation is controlled by a portable transmitting device, said radar comprising:
    a radar apparatus for detecting intrusions including means for transmitting and receiving hyperfrequency radiation;
    an alarm device connected with said radar apparatus for providing a warning in response to an intrusion detected by said radar apparatus and capable of being set into either of two stable states: an operative state wherein said alarm device is capable of providing a warning in response to intrusions detected by said radar apparatus and an inoperative state wherein said alarm device is inhibited from providing a warning despite the detection of intrusions by said radar apparatus;
    said portable transmitting device selectively emitting switching signals to said radar apparatus for changing the state of said alarm device from said inoperative state to said operative state and from said operative state to said inoperative state;
    means for inhibiting, during a predetermined period following a previous change of state, another change of state of said alarm device despite the reception by said radar apparatus of said switching signals during said predetermined period but permitting after said predetermined period a change of state of said alarm device at the time of reception by said radar apparatus of said switching signals.

2. A premises watch radar according to claim 1, wherein said means for inhibiting comprises conditioning means capable of being set from an inoperative state into an operative state, and when set into said operative state remains in that state for said predetermined period, said conditioning means being set into its operative state in response to a change of state of said radar apparatus, so that said inhibiting means is rendered operative to inhibit a change of state during the predetermined period that said conditioning means remains in said operative state.

3. A premises watch radar according to claim 1, wherein said portable transmitting device comprises modulation coding means, and said alarm device comprises a decoding means.

4. A premises watch radar according to claim 1, further comprising:
    means for initially setting said alarm device into said inoperative stable state when electric power is first applied to said radar apparatus regardless of the presence of radiation from said portable transmitting device.

5. A premises watch radar according to claim 1, wherein said alarm device includes means for momentarily activating said warning in response to a change of state of said alarm device.

6. A premises watch radar controlled by a portable transmitting device, said radar comprising:
    radar means for detecting intrusions including means for transmitting and receiving radiations of energy;
    alarm means coupled to said radar means for producing a warning in response to said radar means detecting an intrusion, and having two stable states:
    an operative state wherein said alarm means is capable of providing a warning in response to intrusions detected by said radar apparatus and an inoperative state wherein said alarm means is inhibited from providing such a warning; said alarm means including means responsive to a switching signal produced by the actuation of a portable transmitting device by an operator for alternatively switching said alarm means from said inoperative state to said operative state and from said operative state to said inoperative state; and
    means for temporarily inhibiting said switching means from responding to the switching signal upon a first change of state of said alarm means in response to said switching means, to prevent repeated actuations of said transmitting device by an operator from causing repeated changes of state of said alarm means during a predetermined time period following such first change of state.

7. A radar according to claim 6, wherein said temporarily inhibiting means include a monostable circuit which is energized in response to said switching signal for said predetermined period of time.

8. A radar according to claim 7 wherein said switching means includes a bistable circuit which is responsive to said monostable circuit to switch alternatively between first and second stable states thereof upon energization of the output of said monostable circuit.

9. A radar according to claim 6, wherein said radiation transmitting and receiving means is responsive to the switching signal from the portable transmitting device, and said switching means is coupled to said switching signal responsive means for switching said alarm means in response to the switching signal.

10. A radar according to claim 6, further comprising:
    means for initially setting said alarm means into said inoperative stable state when electric power is first applied thereto regardless of the actuation of the portable transmitting device.

11. A premises watch radar according to claim 6, wherein said alarm means includes means for momentarily activating said warning in response to a change of said alarm means from said inoperative to said operative state.

12. A premises watch radar controlled by a portable transmitting device, said radar comprising:
    radar means for detecting intrusions;
    alarm means coupled to said radar means for producing a warning signal in response to said radar means detecting an intrusion and having two stable states:

an operative state wherein said alarm device is capable of providing a warning in response to intrusions detected by said radar means, and an inoperative state wherein said alarm is inhibited from providing a warning;

said alarm means including means responsive to a switching signal produced by the actuation of a portable transmitting device by an operator for alternatively switching the state of said alarm means from said inoperative state to said operative state and from said operative state to said inoperative state; and means for initially setting said alarm means into said inoperative stable state when electric power is first applied to said radar means regardless of the presence of the switching signal produced by actuating of the portable transmitting device.

13. A radar according to claim 12, further comprising means for temporarily inhibiting said switching means from responding to the switching signal for a predetermined period of time following the initial setting of said alarm means into the inoperative stable state thereof.

14. A premises watch radar according to either of claims 6 or 13, wherein said predetermined time period is in the order of 60 seconds.

15. A premises watch radar controlled by a portable transmitting device, said radar comprising: radar means for detecting intrusions and alarm means coupled to said radar means for producing a warning in response to said radar means detecting an intrusion and having two stable states: an operative state wherein said alarm is capable of providing a warning in response to intrusions detected by said radar means and an inoperative state wherein said alarm means is inhibited from providing such warning; said alarm means including:

means responsive to a switching signal produced by the actuation of a portable transmitting device by an operator for alternatively switching the stable state of said alarm means from said inoperative state to said operative state and from said operative state to said inoperative state; and means for momentarily producing said warning when said alarm means is switched from the inoperative state to the operative state thereof.

16. A premises watch radar according to claim 15, further comprising means for temporarily inhibiting said means for alternatively switching the stable state from responding to the switching signal for a predetermined time period in the order of 60 seconds following the initial setting of said alarm means into its inoperative stable state.

* * * * *